3,381,053
EPOXY RESIN COMPOSITIONS CONTAINING GLYCIDYL ETHERS OF HYDROXYMETHYL-1,3-DIOXOLANE
Wilhelm Vogt, Cologne-Sulz, Paul Janssen, Cologne, and Hermann Richtzenhain, Cologne-Sulz, Germany, assignors to Dynamit Nobel Aktiengesellschaft, Troisdorf, Bezirk Cologne, Germany, a corporation of Germany
No Drawing. Filed Sept. 9, 1965, Ser. No. 486,238
Claims priority, application Germany, Sept. 1, 1964, D 45,326
20 Claims. (Cl. 260—830)

ABSTRACT OF THE DISCLOSURE

There are disclosed epoxy resin compositions comprising a curable liquid epoxy resin and as a reactive diluent a glycidyl ether of a 4-hydroxymethyl-1,3-dioxolane having the formula:

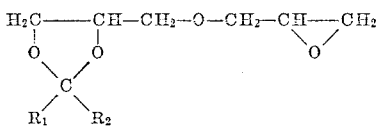

wherein $R_1$ and $R_2$ are each hydrogen, alkyl ($C_{1-10}$), aryl and cycloalkyl and wherein $R_1$ and $R_2$ taken together can form a cycloaliphatic radical. The foregoing compositions do not undergo crystallization and furthermore have a substantially lower viscosity than the epoxy resin component itself. The invention as disclosed also includes the hardened compositions as well as a method of stabilizing epoxy resins of the type herein against crystallization.

---

This invention relates to epoxy resins. It more particularly relates to epoxy resins which are not subject to crystallization, and to such epoxy resins as products.

Epoxy resins are quite well known, as is the use of epoxide-containing compounds for the preparation of resins. Exemplary of this group of known compounds are the reaction products of epichlorhydrin and Bisphenol A [2,2-bis-(4-hydroxyphenyl)-propane]. It is also quite well known to cure such epoxy resins with amine hardeners.

Numerous attempts have been made in the epoxy resin art to product such resins having a lower viscosity than that which is associated with, and characteristic of, the resins presently available. For this purpose relatively volatile solvents have been employed in admixture with the epoxy resin, but such use has been limited to compositions intended for surface coatings to be applied in thin layers, such as, for example, varnishes. This limit of applicability has been necessitated by the fact that the solvent must evaporate during curing, and therefore such compositions are not well suited to the formation of relatively thick articles for coatings.

These desirable properties have also been sought to be attained through the use of reactive diluents of such viscosity that the combination of the epoxy resin and the reactive diluent produces a total composition having a lower viscosity than that of the original epoxy resin. Unlike the inert volatile solvents discussed above, these reactive diluents react along with the epoxy resin on curing and, therefore, their use is not limited to those resins suitable for thin coating purposes. These reactive diluents are exemplified by glycidyl ethers of aliphatic mono- or polyhydric alcohols, as for example n-butyl, furfuryl- and tetrahydrofurfuryl-, allyl-, glycol- and glyceringlycidyl ethers; glycidyl ethers of monohydric phenols such as phenylglycidyl ether, cresylglycidyl ether; glycidyl esters of aliphatic or aromatic carboxylic acids, such as acetic or benzoic acids, and simple low-viscosity mono- or diepoxy compounds, as for instance styrene oxide, butadienediepoxide and vinylcyclohexenediepoxide. The use of these low-viscosity epoxy compounds for the dilution of epoxy resins is, however, affected adversely by the fact that epoxy resins treated with these diluting agents are inclined to crystallize, the more so, the lower the viscosity of the diluting agent.

It is therefore an object of this invention to provide the epoxy resin compositions which have a lower viscosity than the epoxy resins themselves. It is another object of this invention to provide epoxy resin compositions which do not tend to crystallize to a greater extent than does the epoxy portion of such composition.

It is a further object of this invention to provide epoxy resin compositions of lower viscosity than the epoxy resin itself, whose utility is not limited to use in thin films.

Other and additional objects of this invention will be apparent from a consideration of this specification and the claims appended hereto.

In accordance with and for fulfilling these objects, this invention resides in one aspect thereof in the use of a particular class of epoxy-containing reactive diluents in combination with epoxy resins of the known type to produce a composition which does not tend to crystallize to any greater extent than does the epoxy resin itself, while at the same time producing a composition which has a substantially lower viscosity than that of the epoxy resin component of the composition.

The reactive diluents suitable for use in this invention are glycidyl ethers of hydroxymethyl 1,3-dioxolanes corresponding to the formula:

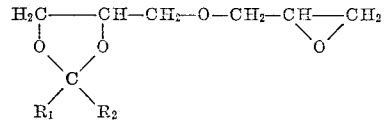

wherein $R_1$ and $R_2$ may be the same or different and may be hydrogen, alkyl, aryl, cycloalkyl, or where $R_1$ and $R_2$ may be together parts of a cycloaliphatic radical, for instance cyclopentyl- or cyclohexyl radical. Exemplary materials within the scope of this invention are where $R_1$ and/or $R_2$ are besides hydrogen, lower alkyl with up to 10 carbon atoms as for instance, methyl, ethyl, butyl, hexyl, octyl, etc., cycloalkyl as, cyclohexyl etc., aryl as phenyl and alkyl-substituted phenyl, e.g., tolyl and methylphenyl.

Another aspect of this invention resides in the use of a combination of reactive diluents, that is, the 1,3-dioxolane epoxide described immediately above may be combined with one or more of the known reactive diluents also set forth above to provide a mixed reactive diluent which, when mixed with the conventional epoxy resins, produces an excellent composition which has a lower viscosity and a lower tendency to crystallization than the epoxy resin portion of the composition. Thus, in this aspect of the invention, the 1,3-dioxolane epoxide acts not only as a viscosity lowering diluent but as a crystallization stabilizer for other viscosity lowering active diluents.

On the addition of the crystallization reducing 1,3-dioxolaneglycidyl ethers, in accordance with the invention the mechanical properties such as, for example, the impact strength and bending strength of an amine cured diandiglycidyl ether are not adversely affected but surprisingly unexpected improved, and substantial other improvements in these properties are imparted to the resin.

The preparation of the diluting agents can be carried out by the conventional methods as, for instance, by reacting the corresponding 1,3-dioxolane alcohol with epichlorhydrin in the presence of alkali. The diluting agents which are suitable for use in accordance with the invention are, at normal temperatures, colorless liquids of low volatility having a pleasant odor and a low viscosity. They are miscible with the diandiglycidyl ethers in substantially any ratio and react with the conventional curing agents in the known manner. The amounts of diluting agent to be added can be varied over a broad range and are conveniently adapted to the desired application. The amount of the diluting agent to be added may range between 0.1 and 25 wt. percent, preferably between 0.5 and 15 wt. percent. Because of the low viscosity of the epoxy resins treated with dioxolaneglycidyl ethers, large amounts of fillers may be incorporated in the resins. Any kind of conventional fillers may be employed.

The epoxy resin compositions having reduced inclination to crystallization and reduced viscosity treated according to the invention with the dioxolaneglycidyl ethers can be used as molding materials, casting resins, adhesives, varnishes, and coating agents.

The 1,3-dioxolane-epoxy reactive diluents of the invention can be prepared by the following techniques: In the description, the 2-ethyl-2-methyl derivative is described, but the procedure of preparation is representative of that used for all such compounds.

Example 1.—Glycidyl ether of 4-hydroxymethyl-2-methyl-2-ethyl-1,3-dioxolane 146 g. of 4-hydroxymethyl-2-methyl-2-ethyl-1,3-dioxolane were heated under reflux with 280 g. of epichlorohydrin and 500 cc. of petroleum ether (boiling range 35–40° C.). Within one hour, 40 g. of powdered caustic soda were added in increments. The water which was formed during the reaction was removed continuously with the petroleum ether. The reaction mixture was heated for another 2 hours, and the remaining amounts of solvent, petroleum ether and excess epichlorohydrin were taken off. Following cooling, the precipitated sodium chloride was filtered off, and the crude dioxolaneglycidyl ether was subsequently distilled in vacuum.

B.P.$_{11}$: 130–132° C.; yield: 80% (with respect to dioxolane alcohol); epoxy value: 0.485/100 g.

The use of the glycidyl ethers of 4-hydroxymethyl-1,3-dioxolane as an addition to the diglycidyl ether of 2,2-bis(4-hydroxyphenyl)propane is shown in the following examples.

Example 2

For a comparison of the mechanical properties, diglycidyl ether of Bisphenol A (epoxy value: 0.53/100 resin) was diluted in one case with 13.5% by weight of 4-hydroxymethyl-2-methyl-2-ethyl-1,3-dioxolaneglycidyl ether, and in another case, with 10% by weight of 2-ethyl-hexyl-glycidyl ether. Both solutions had a viscosity of 1350 cp. (at 25° C.). These solutions were cured at room temperature with stoichiometric amounts of bis($\gamma$-aminopropoxy)-1,4-butane, and the mechanical properties were determined.

In Table I there are set out the values obtained.

TABLE I

| Reactive diluent | Tensile strength (kg./cm.) | Bending strength (kg./cm.²) | Impact resistance (cm. kg./cm.²) | Hardness (kg./cm.²) | Vicat value (° C.) | Martens[1] value (° C.) |
|---|---|---|---|---|---|---|
| Dioxolaneglycidyl ether | 527 | 1,143 | 30.3 | 1,179/1,131 | 60 | 45 |
| 2-ethyl-hexylglycidyl ether | 500 | 919 | 16.3 | 1,179/1,089 | 60 | 44 |

[1] According to DIN (German industrial standards) No. 7708.

Example 3

In Table II which follows there are set out the observed crystallization of the solutions, upon addition of 10% by weight of the diluents hereinafter noted. Diglycidyl ether of Bisphenol A (epoxy value: 0.53/100 g. resin) was treated at 60° C. with 10% by weight of the diluents set out in the table and these solutions were alternately exposed to temperatures of —8° C. and +20° C.

TABLE II

| Diluent | Days until noticeable crystallization | Condition of solutions |
|---|---|---|
| n-Butylglycidyl ether | 5 | Crystallized. |
| o-Cresylglycidylether | 15 | Clouding. |
| Phenylglycidyl ether | 20 | Do. |
| Glycidyl ester of a branched fatty acid (trade name: Versatic 911) | 20 | Do. |
| 2-ethylhexylglycidyl ether | 40 | Do. |
| 4-hydroxymethyl-2,2-dimethyl-1,3-dioxolaneglycidyl ether. | | Clear solution (after 60 days). |
| 4-hydroxymethyl-2-methyl-2-ethyl-1,3-dioxolane glycidyl ether. | | Do. |

Example 4

Diglycidyl ether of Bisphenol A (epoxy value: 0.53/100 g. resin) was diluted with 10% by weight of 2-ethylhexylglycidyl ether and treated, in addition with the amounts of 4 - hydroxymethyl - 2 - methyl - 2 - ethyl - 1,3 - dioxolaneglycidyl ether as disclosed.

The solutions were alternately exposed to temperatures between —20° C. and +20° C., and the condition of the solutions after 50 days was observed.

TABLE III

| Dioxolaneglycidyl ether addition (weight percent) | Viscosity of the solutions (in cp. at 25° C.) | Condition of the solutions after 50 days |
|---|---|---|
| 0 | 1,296 | Clouding. |
| 0.5 | 1,285 | Clear solution. |
| 1.0 | 1,250 | Do. |
| 1.5 | 1,229 | Do. |

Example 5

Diglycidyl ether of Bisphenol A (epoxy value: 0.53/100 g. resin) was diluted with 7.5% by weight of mesityl oxide and then treated with the amounts of 4-hydroxymethyl - 2 - methyl - 2 - ethyl - 1,3 - dioxolaneglycidyl ether as disclosed in Table IV. The solutions were alternately exposed to temperatures between —20° C. and +20° C., and the condition of the solutions after 50 days was observed and recorded.

TABLE IV

| 1,3-dioxolaneglycidyl ether solution (in wt. percent) | Viscosity of the solutions (in cp. at 25° C.) | Condition of the solutions after 50 days |
|---|---|---|
| 0 | 1,181 | Clouding. |
| 0.5 | 1,140 | Clear solution. |
| 1.0 | 1,098 | Do. |
| 1.5 | 1,063 | Do. |

The preceding examples are representative only of the instant invention and are in no way limiting thereon.

What is claimed is as follows:

1. An epoxy resin composition comprising a curable liquid epoxy resin and as a reactive diluent a glycidyl ether of a 4-hydroxy-methyl-1,3-dioxolane having the formula

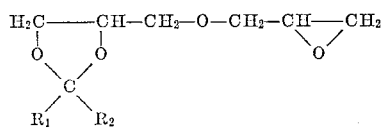

wherein $R_1$ and $R_2$ are each a member selected from the group consisting of hydrogen, alkyl having from 1 to 10 carbon atoms, aryl and cycloalkyl and wherein $R_1$ and $R_2$ taken together with the carbon atoms to which they are attached can form a cycloaliphatic group, said 1,3-dioxolane being present in an amount of from 0.1 to 25 wt. percent.

2. A composition as claimed in claim 1, wherein said 1,3-dioxolane is 2-methyl-2-ethyl-4-hydroxymethyl - 1,3-dioxolane.

3. A composition as claimed in claim 1 wherein said 1,3-dioxolane is 4-hydroxy-methyl-2,2-dimethyl-1,3-dioxolane.

4. A composition as claimed in claim 1 wherein said glycidyl ether is employed in an amount of 1 to 25 wt. percent.

5. A composition as claimed in claim 1 wherein said glycidyl ether is employed in an amount of 0.5 to 15 wt. percent.

6. A composition as claimed in claim 1 wherein said epoxy resin is the diglycidyl ether of 2,2-bis-(4-hydroxyphenyl)-propane.

7. A composition as claimed in claim 1 having in addition to the constituents therein named another reactive diluent selected from the group consisting of glycidyl ethers of aliphatic, mono- and poly-hydric alcohols, glycidyl ethers of mono-hydric phenols and glycidyl esters of aliphatic and aromatic carboxylic acids and low viscosity mono- and di-epoxy compounds.

8. A composition as claimed in claim 2 wherein said reactive diluent is a glycidyl ester of a branched fatty acid.

9. A composition as claimed in claim 2 wherein said reactive diluent is 2-ethyl-hexyl-glycidyl ether.

10. A composition as claimed in claim 2 wherein said reactive diluent is phenyl-glycidyl-ether.

11. An article which is the composition claimed in claim 1 cured with an amine curing agent.

12. An article as claimed in claim 11 wherein said amine is bis-(γ-aminopropoxy)-1,4-butane.

13. An article which is the composition claimed in claim 2 cured with an amine curing agent.

14. An article as claimed in claim 13 wherein said amine is bis-(γ-aminopropoxy)-1,4-butane.

15. A method of stabilizing diandiglycidyl ethers against crystallisation which comprises forming a mixture of a curable liquid epoxy resin and as a reactive diluent a glycidyl ether of 4-hydroxymethyl-1,3-dioxolane having the formula

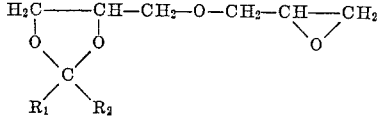

wherein $R_1$ and $R_2$ are each a member selected from the group consisting of hydrogen, alkyl having from 1 to 10 carbon atoms, aryl and cycloalkyl and wherein $R_1$ and $R_2$ taken together with the carbon atom to which they are attached can form a cycloaliphatic group, said 1,3-dioxolane being present in an amount of from 0.1 to 25 wt. percent.

16. Method according to claim 15 wherein said glycidyl ether is 4-hydroxymethyl-2,2-dimethyl-1,3-dioxolane glycidyl ether.

17. An epoxy resin composition comprising a curable liquid epoxy resin and as a reactive diluent a glycidyl ether of 4-hydroxymethyl-2-methyl-2-ethyl-1,3-dioxolane-glycidyl ether in an amount of from 0.1 to 25 wt. percent.

18. A method of preparing epoxy resin compositions having improved mechanical and physical properties which comprises forming a first mixture of a curable liquid epoxy resin and as a reactive diluent therefor a glycidyl ether of a 4-hydroxymethyl-1,3-dioxolane having the formula

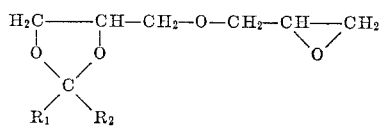

wherein $R_1$ and $R_2$ are each a member selected from the group consisting of hydrogen, alkyl having from 1 to 10 carbon atoms, aryl and cycloalkyl and wherein $R_1$ and $R_2$ taken together with the carbon atom to which they are attached can form a cycloaliphatic group, said 1,3-dioxolane being present in an amount of from 0.1 to 25 wt. percent, adding an amine hardener to said mixture and curing the resultant mixture to thereby obtain a rigid structure having improved mechanical and physical properties.

19. A method according to claim 18 wherein said epoxy resin is a glycidyl ether of Bisphenol A and said reactive diluent is 4-hydroxymethyl-2-methyl-2-ethyl-1,3-dioxolane-glycidyl ether and said amine hardener is bis-(γ-aminopropoxy)-1,4-butane.

20. A method according to claim 19 wherein there is additionally incorporated in said mixture a filler.

No references cited.

MURRAY TILLMAN, *Primary Examiner.*

P. LIEBERMAN, *Assistant Examiner.*

UNITED STATES PATENT OFFICE
CERTIFICATE OF CORRECTION

Patent No. 3,381,053　　　　　　　　　　　　April 30, 1968

Wilhelm Vogt et al.

It is certified that error appears in the above identified patent and that said Letters Patent are hereby corrected as shown below:

Column 1, line 46, "product" should read -- produce --. Column 5, line 4, "atoms" should read -- atom --; lines 30, 33, 35, and 42, the claim reference numeral "2", each occurrence, should read -- 7 --.

Signed and sealed this 7th day of October 1969.

(SEAL)
Attest:

Edward M. Fletcher, Jr.　　　　　　　　WILLIAM E. SCHUYLER, JR.
Attesting Officer　　　　　　　　　　　　Commissioner of Patents